Aug. 24, 1948.  H. MORDERS  2,447,956
MEANS FOR CONNECTING SEPARATED
PARTS OF BICYCLE FRAMES
Filed May 25, 1944

INVENTOR.
Howard Morders
BY Miller & Miller
ATTORNEYS.

Patented Aug. 24, 1948

2,447,956

UNITED STATES PATENT OFFICE 2,447,956

MEANS FOR CONNECTING SEPARATED PARTS OF A BICYCLE FRAME

Howard Morders, Bethesda, Md.

Application May 25, 1944, Serial No. 537,261

1 Claim. (Cl. 287—116)

This invention relates to a separable frame for bicycles and has for an object to provide an improved means of separating a bicycle frame into two separate and distinct parts so that it may be carried in the trunk or elsewhere in an automobile or other vehicle and will occupy the minimum amount of space when doing so.

A further object of this invention is to provide a separable frame for bicycles which can be manually separated into two parts for carrying in a vehicle and which can be joined together again, wherein the separating action and the joining action can be performed by a person of average strength without any tools, and by a person of less than average strength with a small, simple straight wrench of conventional style, and further, where the act of separating or joining the frame takes but a very few moments.

A further object of this invention is to provide a joining means which may be installed in a bicycle as originally manufactured, and likewise, may be installed in any existing bicycle by any plumber or pipejoiner by following simple and easily understandable directions, thus enabling the vast number of existing bicycles to be converted into separable frame bicycles according to this invention.

The inventor of this separable frame is aware of the prior U. S. Patents Nos. 379,017; 576,696; 578,921; 599,016; 607,325; 617,535; 1,394,866; 1,287,130 and 2,211,164; but none of these patents disclose a separable bicycle frame having the advantages and conveniences of the present invention, for none of them show a means, applicable to any existing bicycle, for separating and joining a bicycle frame with the features above discussed.

Figure 1:
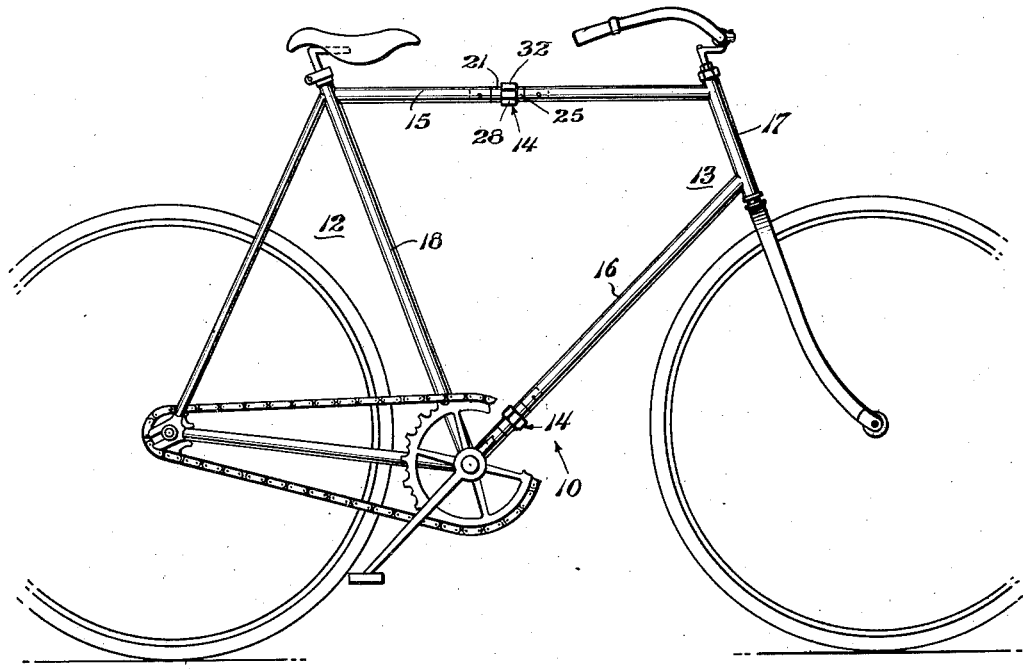
Figure 2:
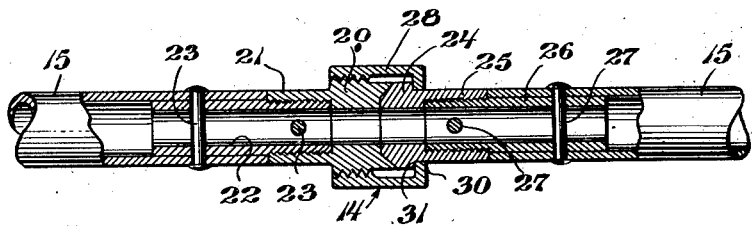

With the foregoing and other objects in view, as will hereinafter become apparent, this invention comprises the combinations, constructions, and arrangement of parts hereinafter set forth, disclosed, and claimed and illustrated in the accompanying drawings, wherein:

Fig. 1 is a side view, partly broken away, of a bicycle frame to which this invention has been applied, and Fig. 2 is an enlarged fragmentary sectional view through one of the joints.

There is shown at 10 a conventional bicycle to which this invention has been applied. Such a bicycle, before this invention has been applied, is too large to be conveniently carried in an automobile, either in the average trunk or elsewhere. In applying this invention to such a conventional bicycle 10, the frame 11 is divided into two smaller portions 12 and 13, each of which is capable of being separately stowed in an automobile trunk or other convenient space on a car, by inserting a joint 14 in each of the top and bottom bars 15 and 16, joining the front bar 17 to the rear bar 18 of the usual frame diamond. While the joints 14, both of which are identical, may be placed anywhere along the bars 15 and 16, the best result is secured when the joint is placed at about the middle of the top bar 15 and at a position in the bottom bar 16 directly below the joint in the top bar 15.

The joint 14 is very similar to what is known as a plumber's union, and consists of threaded female pipe section 20 having a pipe end 21 of the same external diameter as the frame bars 15 and 16 and threaded on a reduced extending neck 22 of a diameter to fit a distance into the cut end of the frame bar, to which it is permanently and firmly secured by the pin or rivet 23, and if desired, it may be made more secure by brazing it thereto. If desired, an additional rivet, preferably at right angles to rivet 23 may be added through the neck 22. A headed male pipe portion 24 is secured to the other part of the frame bar in the same manner by a pipe section 25 and extending neck 26 similarly secured to the frame bar by the pin or rivet 27.

It will be particularly noted that the mating ends of the male and female pipe portions are angular, being either conical or slightly ball and socket shaped, thereby insuring a good fit therebetween. A nut 28, cooperating with the thread on female pipe section 20, is provided with an internal flange 30 about the pipe section 25 and behind the shoulder 31 between the male head 24 and pipe section 25, and may be manually operated to draw the joint together, and similarly manually operated to separate the joint, by a person of usual strength, although to take care of a person of lesser strength, the nut may be hexagonal as shown at 32 to cooperate with a conventional small straight open ended wrench.

In operation, when installing the joints 14 in an existing bicycle, a section of the original frame bars 15 and 16 equal in length to the distance between the shoulders at the ends of the pipe portions 20 and 25 is cut out and discarded, so that when the joint 14 is installed in each bar, the overall length of the bicycle is unchanged. To separate the frame into the two sections, the nuts 28 are unscrewed from the female threaded pipe sections 20, and the frame is then in two separate pieces, permitting the bicycle to be carried in separate portions. To reassemble the frame for use, the frame is held with the joint portions in mating position, and the nuts are manually tightened, making it ready for use. Obviously, if the invention is applied to a three bar frame, an extra joint will be used. Likewise, it may obviously be applied to the women's type of bicycle by cutting the bars between the front and rear bars in a similar manner.

While the device has been shown and the structure described in detail, it is obvious that this invention is not to be considered limited to the exact form disclosed, and changes may be made therein, within the scope of what is claimed, without departing from the spirit of the invention.

Having thus set forth and disclosed the nature of this invention, what is claimed is:

Means for connecting separated parts of a bicycle frame composed of hollow cross bars having end sections terminating in spaced relation, said means comprising a union joint for detachably connecting the ends of the cross bars together, said union joint comprising two joint members each comprising an enlarged mating head, and a body portion of an external diameter substantially equal to the external diameter of the frame cross bars, one of the enlarged mating heads being at one end of each of the body portions thereby providing a shoulder between the head and the body portion, and a reduced neck at the other end of each of the body portions of an external diameter substantially equal to the internal diameter of the frame cross bars thereby providing a second shoulder on the joint member, means for securing the reduced neck of one joint member within the cross bar end section of one separated bicycle part with said second shoulder of the joint member abutting the end of the cross bar, similar means for securing the other joint member to the cross bar of the other separated bicycle frame part, one of said mating heads being male, the other mating head being female, an external thread about one of the mating heads, a corresponding threaded nut extending from over the other mating head, said nut having an internal flange extending behind the shoulder between the head and body portion, whereby when said nut is tightened over said thread, said heads are drawn into and held in firm mating relation to thereby hold the separated bicycle frame cross bars in rigid axial alignment, and when said nut is released from said thread, the bicycle frame cross bars are separated into two detached parts.

HOWARD MORDERS.

REFERENCES CITED

The following references are of record in the file of this patent:

UNITED STATES PATENTS

| Number | Name | Date |
|---|---|---|
| 430,617 | Bullock | June 24, 1890 |
| 540,834 | Gumm | June 11, 1895 |
| 717,684 | Humphreys | Jan. 6, 1903 |
| 872,001 | Massie | Nov. 26, 1907 |
| 935,071 | Vossler | Sept. 28, 1909 |
| 966,870 | Stoddard | Aug. 9, 1910 |
| 1,963,462 | Brock | June 19, 1934 |
| 2,211,164 | Rippenbein | Aug. 13, 1940 |